(12) United States Patent
Tsuchiya et al.

(10) Patent No.: US 8,446,035 B2
(45) Date of Patent: May 21, 2013

(54) POWER SUPPLY DEVICE AND VEHICLE

(75) Inventors: Takenori Tsuchiya, Toyota (JP);
Takahiro Suzuki, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 424 days.

(21) Appl. No.: 12/304,714

(22) PCT Filed: Jun. 8, 2007

(86) PCT No.: PCT/JP2007/062071
§ 371 (c)(1),
(2), (4) Date: Dec. 12, 2008

(87) PCT Pub. No.: WO2007/145304
PCT Pub. Date: Dec. 21, 2007

(65) Prior Publication Data
US 2009/0167077 A1    Jul. 2, 2009

(30) Foreign Application Priority Data

Jun. 14, 2006 (JP) ................... 2006-164964

(51) Int. Cl.
*B60L 1/00* (2006.01)
(52) U.S. Cl.
USPC ........................................ 307/9.1; 307/10.1
(58) Field of Classification Search
USPC .................................. 307/9.1, 10.1
See application file for complete search history.

(56) References Cited

U.S. PATENT DOCUMENTS

| | | | | |
|---|---|---|---|---|
| 6,151,222 A * | 11/2000 | Barrett | ............................. | 363/16 |
| 6,379,837 B1 * | 4/2002 | Takahashi et al. | ............. | 429/151 |
| 6,457,542 B1 * | 10/2002 | Hosono et al. | ............... | 180/68.1 |
| 6,507,506 B1 * | 1/2003 | Pinas et al. | ....................... | 363/79 |
| 6,556,097 B2 * | 4/2003 | Coffey | ......................... | 333/24 R |
| 6,654,228 B1 * | 11/2003 | Bailey | ............................ | 361/502 |
| 6,724,100 B1 * | 4/2004 | Gabriel | .......................... | 307/9.1 |
| 6,791,295 B1 * | 9/2004 | Berels | ............................. | 320/103 |
| 6,803,749 B2 * | 10/2004 | Manabe et al. | ............... | 323/222 |
| 6,902,020 B2 * | 6/2005 | Kronner et al. | .............. | 180/68.5 |
| 6,919,648 B2 * | 7/2005 | Bolz et al. | .................... | 290/40 C |
| 6,931,878 B2 * | 8/2005 | Kubota et al. | ................ | 62/259.2 |
| 7,079,379 B2 * | 7/2006 | Yamaguchi et al. | ........... | 361/676 |
| 7,215,023 B2 * | 5/2007 | Baeumel et al. | .............. | 257/724 |

(Continued)

FOREIGN PATENT DOCUMENTS

| | | |
|---|---|---|
| JP | 09-149552 A | 6/1997 |
| JP | 09-200902 A | 7/1997 |

(Continued)

OTHER PUBLICATIONS

JP Pg-pub 2004/281489 to Takahashi—english abstract, Oct. 7, 2004.*

*Primary Examiner* — Adi Amrany
(74) *Attorney, Agent, or Firm* — Sughrue Mion, PLLC

(57) ABSTRACT

A power supply device to be mounted on a vehicle includes a battery module, a power storage casing for accommodating the battery module, a DC/DC converter stepping down an output voltage of the battery module to a first voltage and a DC/DC converter stepping down the output voltage of the battery module into a second voltage. The battery module, DC/DC converter and DC/DC converter are fixed to the power storage casing. This structure provides the power supply device of small sizes capable of supplying electricity of three or more kinds of voltages.

4 Claims, 5 Drawing Sheets

U.S. PATENT DOCUMENTS

| | | | | |
|---|---|---|---|---|
| 7,767,354 B2 * | 8/2010 | Saito et al. | | 429/433 |
| 7,863,845 B2 * | 1/2011 | Kasai et al. | | 318/440 |
| 7,967,093 B2 * | 6/2011 | Nagasaka | | 180/68.5 |
| 8,205,939 B2 * | 6/2012 | Takagi | | 297/180.12 |
| 2002/0035973 A1 * | 3/2002 | Takahashi | | 123/41.29 |
| 2002/0104697 A1 * | 8/2002 | Hatanaka | | 180/65.4 |
| 2003/0067747 A1 * | 4/2003 | Hasegawa et al. | | 361/695 |
| 2003/0155814 A1 * | 8/2003 | Gronbach | | 307/130 |
| 2004/0163858 A1 * | 8/2004 | Borrego Bel et al. | | 180/65.1 |
| 2004/0201362 A1 * | 10/2004 | Borrego Bel et al. | | 320/104 |
| 2005/0030691 A1 * | 2/2005 | Bolz et al. | | 361/152 |
| 2005/0111167 A1 * | 5/2005 | Yamaguchi et al. | | 361/676 |
| 2005/0230160 A1 | 10/2005 | Watanabe et al. | | |
| 2005/0238949 A1 * | 10/2005 | Morris et al. | | 429/113 |
| 2005/0285563 A1 | 12/2005 | Yoneda | | |
| 2007/0116135 A1 * | 5/2007 | Tsuchida | | 375/259 |
| 2008/0130259 A1 * | 6/2008 | Hederoth | | 361/816 |
| 2008/0234897 A1 * | 9/2008 | Tsuchida | | 701/42 |

FOREIGN PATENT DOCUMENTS

| | | | |
|---|---|---|---|
| JP | 2004-106807 A | | 4/2004 |
| JP | 2004-114821 A | | 4/2004 |
| JP | 2004-281489 A | * | 10/2004 |
| JP | 2005-129441 A | | 5/2005 |
| JP | 2005-178732 A | | 7/2005 |
| JP | 2005-297860 A | | 10/2005 |
| JP | 2006-0012471 A | | 1/2006 |

* cited by examiner

POWER SUPPLY DEVICE AND VEHICLE

CROSS REFERENCE TO RELATED APPLICATION

This application is a National Stage of International Application No. PCT/JP2007/062071 filed Jun. 8, 2007, claiming priority based on Japanese Patent Application No. 2006-164964, filed Jun. 14, 2006, the contents of all of which are incorporated herein by reference in their entirety.

TECHNICAL FIELD

The present invention relates to a power supply device and a vehicle with the power supply device.

BACKGROUND ART

In recent years, electric vehicles using an electric motor as a drive source as well as so-called hybrid electric vehicles using a combination of an electric motor and another type of drive source such as an internal combustion engine or a fuel cell have been practically available. This kind of vehicle is provided with a power storage unit for supplying electricity, i.e., energy to the electric motor. A repetitively chargeable secondary battery, a capacitor or the like is arranged as the power storage unit.

A nickel cadmium battery, a nickel hydrogen battery or a lithium ion battery is used as the secondary battery. The secondary battery includes, e.g., a battery module having layered battery cells. The battery module is mounted on the vehicle together with a power storage casing accommodating it. The battery module supplies a DC power. Since the secondary battery mounted on the vehicle is required to provide a high voltage and a high output, it is formed of about thirty battery modules connected in series. Each battery cell is formed of about six cells connected in series and each having an output of about 1.2 V. This battery module achieves a high input/output voltage.

The motor providing a drive power of the vehicle is driven by an AC power. DC electricity provided from the power storage unit is converted into AC electricity, which is fed to the motor. The power supply device may be connected to control units and/or auxiliary devices such as an audio unit in addition to the inverter for driving the motor. These units and devices are driven with a low voltage. Therefore, the power supply device may be provided with a converter for stepping down the voltage of the power storage unit.

Japanese Patent Laying-Open No. 2004-114821 has disclosed a power supply package having power supply parts of a 42-V system and power supply parts of a 14-V system that are arranged and integrated in a package casing to be arranged in an engine room of a vehicle. In this power supply package, all power supply interconnections for mutual connection between power supply parts or for external connection thereof are formed of bus bars, and the bus bars of the power supply parts can be connected together only by sliding these parts in the attaching direction. According to the disclosure, this power supply package can provide a wiring-less structure, and can facilitate mounting and wiring operations. Also, according to the disclosure, the power supply package includes an inverter, a DC/DC converter, a 36-V battery, a 12-V battery and others that are arranged in the package casing, and are accommodated in the engine room of the vehicle together with the package casing.

Japanese Patent Laying-Open No. 2004-106807 has disclosed a hybrid vehicle having a high-potential battery supplying an electric power to a drive motor driving a vehicle as well as a low-potential battery supplying an electric power to auxiliary devices of the vehicle. The high-potential battery is formed of a plurality of divided battery units, and the divided battery units of the high-potential battery as well as the low-potential battery are arranged behind a rearmost seat of the vehicle, and are located in spaced two positions that neighbor to sidewalls of a vehicle body, respectively. According to the disclosure, this hybrid vehicle can achieve a good balance in vehicle weight, a flat baggage compartment and a trunk-through structure.

Japanese Patent Laying-Open No. 2005-297860 has disclosed a power supply device for a vehicle and particularly for a hybrid vehicle that uses in combination a high-voltage battery and an auxiliary battery (i.e., battery for auxiliary devices) arranged in the rear of the vehicle. In this power supply device, a fusible link box is arranged near the auxiliary battery of 12 V, and a power line that is an output line of a DC/DC converter performing voltage conversion between the high-voltage battery and the auxiliary battery is not returned to an engine room but is connected to the fusible link box. According to the disclosure, wiring paths of electric power lines can be easily ensured in this power supply device for the vehicle.

Japanese Patent Laying-Open No, 2005-178732 has disclosed a cooling device of a high-voltage electric device for a vehicle motor. In this device, a battery, an inverter, a DC-DC converter and a fan are arranged concentratedly under a rear seat, a cooling air inlet is arranged under one side, in a vehicle width direction, of the rear seat and a cooling air outlet is arranged under the other side. According to the disclosure, this device can efficiently cool high-voltage electric units without causing lowering of utility and the like.

Japanese Patent Laying-Open No. 9-149552 has disclosed a power supply device that includes a main battery having a voltage of 300 V, a voltage converter converting the voltage of the main battery into 12 V and a voltage converter converting the voltage of the main battery into 24 V.

Japanese Patent Laying-Open No. 9-200902 has disclosed a power supply device for an electric vehicle that includes a main power supply feeding a electric power to a drive motor controlled by a drive motor control device, and a plurality of sub-power supplies that are employed for supplying powers to electric loads of various rated voltages different from that of the drive motor, and are formed of voltage converters for converting the voltage of the main power supply into voltages corresponding to the various rated voltages of the plurality of sub-power supplies, respectively.

The voltages taken out from the power supply device are, e.g., about 12 V and 30 V, respectively. In recent years, a power supply for a voltage(s) different from these voltages has been required in some cases. In some cases, the voltage of about 12 V cannot provide a sufficient drive power, e.g., to an electric power steering device that is driven by an electric motor, and the voltage of about 300 V is excessively high for it. Accordingly, it has been studied to use electricity, e.g., of about 40 V as the power supply for driving the electric power steering. As described above, another kind of voltage is required in addition to the voltages supplied from the conventional power supply in some cases.

The power supply package disclosed in the above Japanese Patent Laying-Open No. 2004-114821 includes the 36-V battery and 12-V battery. These batteries arranged for the high and low voltage systems, respectively, increase the sizes of the power supply device. In the Japanese Patent Laying-Open No. 9-149552 or 9-200902, the main battery is connected to a plurality of voltage converters for supplying the electricity of a plurality of voltages, but the structures and arrangement of the various devices or units are not disclosed.

DISCLOSURE OF THE INVENTION

An object of the invention is to provide a power supply device of small sizes that can supply electricity of three or more kinds of voltages as well as a vehicle provided with the power supply device.

A power supply device according to the invention is a power supply device to be mounted on a vehicle, and includes a power storage unit; a power storage casing for accommodating the power storage unit; a first converter stepping down an output voltage of the power storage unit to a first voltage; and a second converter stepping down the output voltage of the power storage unit to a second voltage. The power storage unit as well as the first and second converters are fixed to the power storage casing.

Preferably, in the invention, the first converter is arranged at one end of the power storage casing. The second converter is arranged at the other end opposite to the one end of the power storage casing.

Preferably, in the invention, the first converter is configured to be forcedly cooled by a cooling device. The second converter is configured to be cooled by self-cooling.

A vehicle according to the invention is provided with the foregoing power supply device, and the first and second converters are arranged at widthwise opposite ends of a vehicle body, respectively. The first and second converters are arranged without protruding from front and rear end surfaces, on front and rear sides of the vehicle body, of said power storage casing.

The invention can provide the power supply device of small sizes that can supply three or more kinds of voltages as well as a vehicle provided with the power supply device.

BEST MODES FOR CARRYING OUT THE INVENTION

Referring to FIGS. 1 to 6, a power supply device and a vehicle provided with the power supply device according to an embodiment of the invention will be described below.

Figure 1:
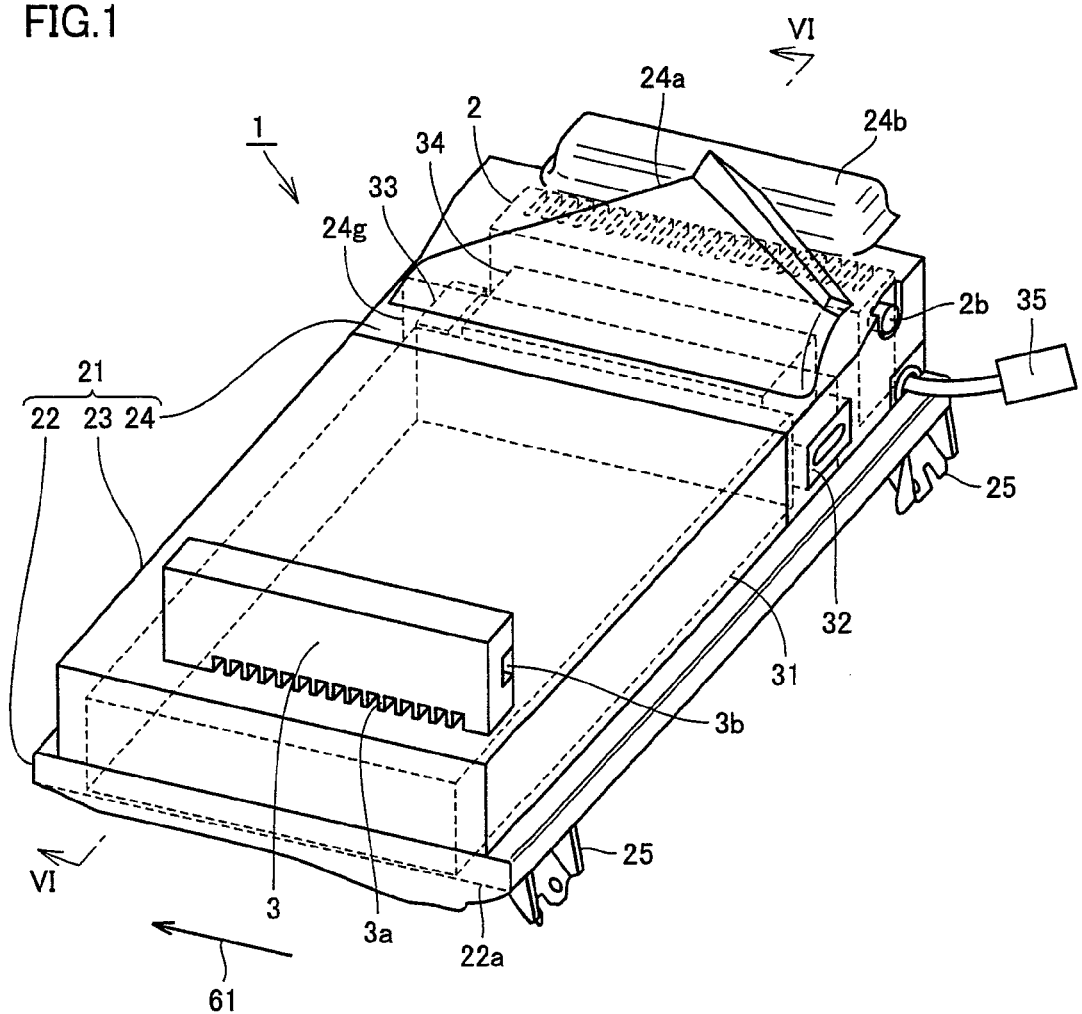
FIG. 1 is a schematic perspective view of a power supply device according to an embodiment of the invention.

FIG. 1 is a schematic perspective view of the power supply device according to the embodiment. The power supply device according to the embodiment is mounted on the vehicle. An arrow 61 indicates a forward direction of a vehicle body.

A power storage unit such as a secondary battery or a capacitor is mounted on the vehicle together with a power storage casing accommodating it. In this invention, a unit including the power storage unit and the power storage casing is referred to as a power storage pack. The power storage pack may include other components. The other components include, e.g., an air blower such as a cooling duct and/or a cooling fan for cooling the power storage unit.

The power supply device according to the embodiment includes a power storage pack 1, which includes a battery module 31 as a power storage unit. The battery module in the embodiment is a secondary battery. Battery module 31 is configured to supply an electric power to a motor during start, acceleration or hill climbing, and to store an electric power regeneratively generated during deceleration.

Battery module 31 in the embodiment includes a plurality of battery cells. Battery module 31 is formed of an arrangement of the plurality of battery cells. In battery module 31 in the embodiment, the battery cells of 1.2 V are connected together in series to output a voltage of 288 V.

Power storage pack 1 in the embodiment includes a power storage casing 21 for accommodating the power storage unit. Power storage casing 21 has a box-like form, and includes a lower casing 22 and upper casings 23 and 24. Lower casing 22 has plates 25. Plates 25 can be fixed to a carrier member of the vehicle body. Plates 25 are formed at a rear end (i.e., an end on the rear side of the vehicle) of power storage casing 21.

Power storage pack 1 in the embodiment includes an electric unit 34. Power storage pack 1 includes a DC/DC converter 2 that is electrically connected to battery module 31 and serves as a first converter for stepping down the voltage to a first voltage. DC/DC converter 2 in the embodiment is configured to convert the output of 288 V of battery module 31 into 12 V. DC/DC converter 2 is arranged inside power storage casing 21.

Power storage pack 1 includes a DC/DC converter 3 that serves as a second converter for stepping down the voltage of battery module 31 to a second voltage. DC/DC converter 3 in the embodiment is configured to convert the output of 288 V of battery module 31 into 42 V.

In the embodiment, DC/DC converter 3 is arranged outside power storage casing 21. DC/DC converter 3 is fixed to an outer surface of upper casing 23. DC/DC converter 3 is connected to battery module 31 via a lead wire (not shown).

Upper casing 24 in the embodiment has an intake duct 24a for leading a cooling air into power storage casing 21. Upper casing 24 has an exhaust duct 24b for discharging the cooling air from the inside of power storage casing 21.

Figure 2:
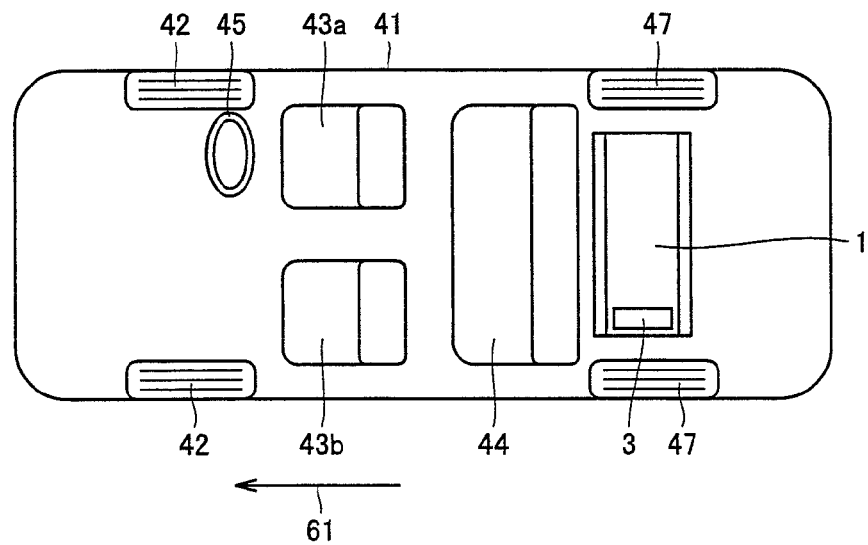
FIG. 2 is a schematic cross section of a vehicle according to the embodiment of the invention.

FIG. 2 is a schematic cross section of the vehicle provided with the power supply device according to the embodiment. The vehicle according to the embodiment is a so-called sedan type of automobile. The vehicle includes a body 41, which has a longitudinal direction. The vehicle of the embodiment includes tires 42 and 47. Tires 42 are front tires, and tires 47 are rear tires.

The vehicle according to the embodiment has two rows of seats, i.e., front seats 43a and 43b as well as a rear seat 44. Rear seat 44 is the most rearmost seat. The vehicle has a steering wheel 45 arranged in front of front seat 43a, i.e., a driver's seat.

Power storage pack 1 in the embodiment is arranged behind rear seat 44. Power storage pack 1 is arranged such that a longitudinal direction thereof is substantially parallel to the width direction of the vehicle. Power storage pack 1 is arranged inside a trunk room.

Figure 3:
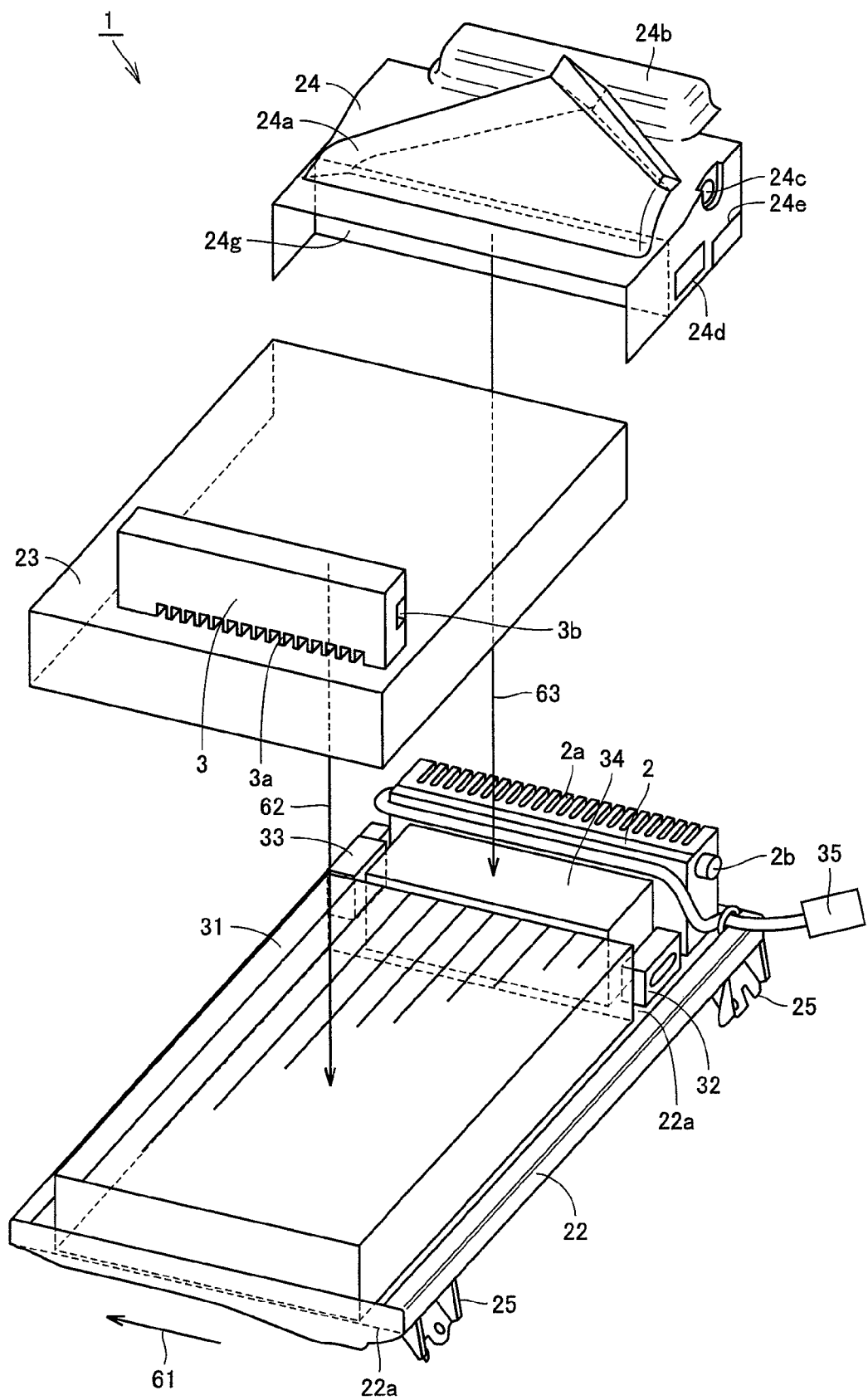
FIG. 3 is a schematic exploded perspective view of the power supply device according to the embodiment of the invention.

FIG. 3 is a schematic exploded perspective view of the power storage pack in the embodiment. In the embodiment, various units are arranged in lower casing 22. Upper casings 23 and 24 are configured to cover the various units arranged in lower casing 22. Upper casings 23 and 24 are fitted to lower casing 22 as indicated by arrows 62 and 63.

Lower casing 22 has a base plate 22a for arranging electric unit 34, DC/DC converter 2 and the like thereon. Base plate 22a has a through hole (not shown) to pass the cooling air therethrough.

Electric unit 34 includes a relay for controlling a voltage circuit receiving electricity from battery module 31, various sensors or a battery computer for sensing states of battery module 31 and the like. Electric unit 34 is arranged near a side of battery module 31.

Power storage pack 1 in the embodiment has a service plug 32. Service plug 32 is configured such that a high-voltage circuit can be interrupted by pulling out service plug 32 from the body of power storage pack 1 for inspecting or maintaining power storage pack 1. Upper casing 24 has an opening 24d for exposing service plug 32.

DC/DC converter 2 can step down the high voltage provided from battery module 31 to a voltage for use in auxiliary devices such as lamps of the vehicle and an audio device as well as various ECUs (Electronic Control Units) mounted on the vehicle.

DC/DC converter 2 in the embodiment can charge the auxiliary battery (not shown). DC/DC converter 2 has a rectangular parallelepiped form. DC/DC converter 2 is fixed to base plate 22a of lower casing 22. A longitudinal direction of DC/DC converter 2 is substantially parallel to the width direction of power storage pack 1.

DC/DC converter 2 has fins 2a. Each fin 2a has a plate-like form. DC/DC converter 2 is arranged with fins 2a directed outward. DC/DC converter 2 in the embodiment is arranged with fins 2a extending in a sideway direction of the vehicle body. Fins 2a are arranged at an end of power storage casing 21.

DC/DC converter 2 has a connection unit 2b for supplying the stepped-down electricity. Connection unit 2b in the embodiment is directed toward the rear side of the vehicle body from DC/DC converter 2. Upper casing 24 has an opening 24c for exposing connection unit 2b. A lead wire is connected to connection unit 2b for supplying the electricity of 12 V.

Power storage pack 1 in the embodiment has an output terminal 33 for externally supplying the electricity of 288 V of battery module 31. Output terminal 33 is connected, e.g., to an inverter for supplying AC electricity to the motor. Output terminal 33 is arranged near the side of battery module 31. Output terminal 33 in the embodiment is directed to the front side of the vehicle body.

Power storage pack 1 in the embodiment has a communication cable 35 for external communications. Communication cable 35 allows communications with external control units. Upper casing 24 has an opening 24e for passing communication cable 35 therethrough.

DC/DC converter 3 has a rectangular parallelepiped form. A longitudinal direction of DC/DC converter 3 is substantially parallel to the width direction of the power storage pack. A length of DC/DC converter 3 in the longitudinal direction is shorter than a length of upper casing 23 in its width direction. DC/DC converter 3 thus arranged does not protrude from the end surfaces, on the front and rear sides of the vehicle body, of upper casing 23.

DC/DC converter 3 has a connection unit 3b for supplying the stepped-down electricity. By connecting a lead wire to connection unit 3b, the stepped-down electricity of 42 V is supplied. DC/DC converter 3 in the embodiment has fins 3a for cooling the DC/DC converter. Each fin 3a has a plate-like form.

The power of 42 V supplied from DC/DC converter 3 is used, e.g., for the electric power steering. The electric power steering has a function of adding an axial force for the steering wheel by an electric motor or the like. For example, an axis-rotating force of a steering wheel may be large in a large vehicle. Even in a small vehicle, an axis-rotating force of a steering wheel may increase depending on grounding conditions of tires. In these vehicles, the power supply of 12 V cannot provide a sufficient axis-rotating force. The power supply device according to the embodiment can supply the electricity of the voltage of 42 V, and can stably assist the steering even in the vehicle requiring a large axis-rotating force for the steering wheel.

Upper casing 24 has a partition 24g for arranging battery module 31 in a closed space. Partition 24g is spaced from battery module 31 with intake duct 24a therebetween.

Figure 4:
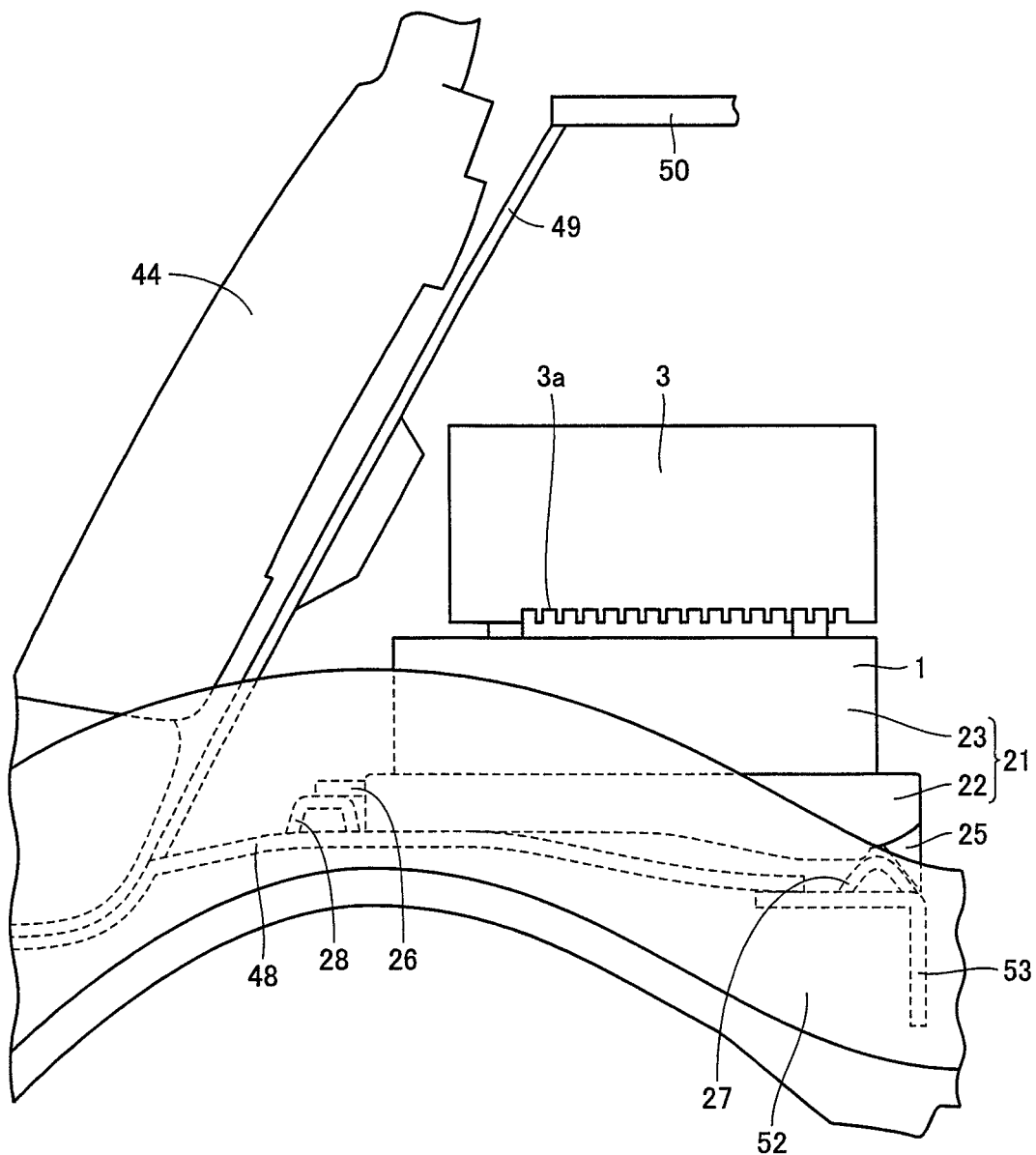
FIG. 4 is a first schematic cross section of the vehicle provided with the power supply device according to the embodiment of the invention.
Figure 5:
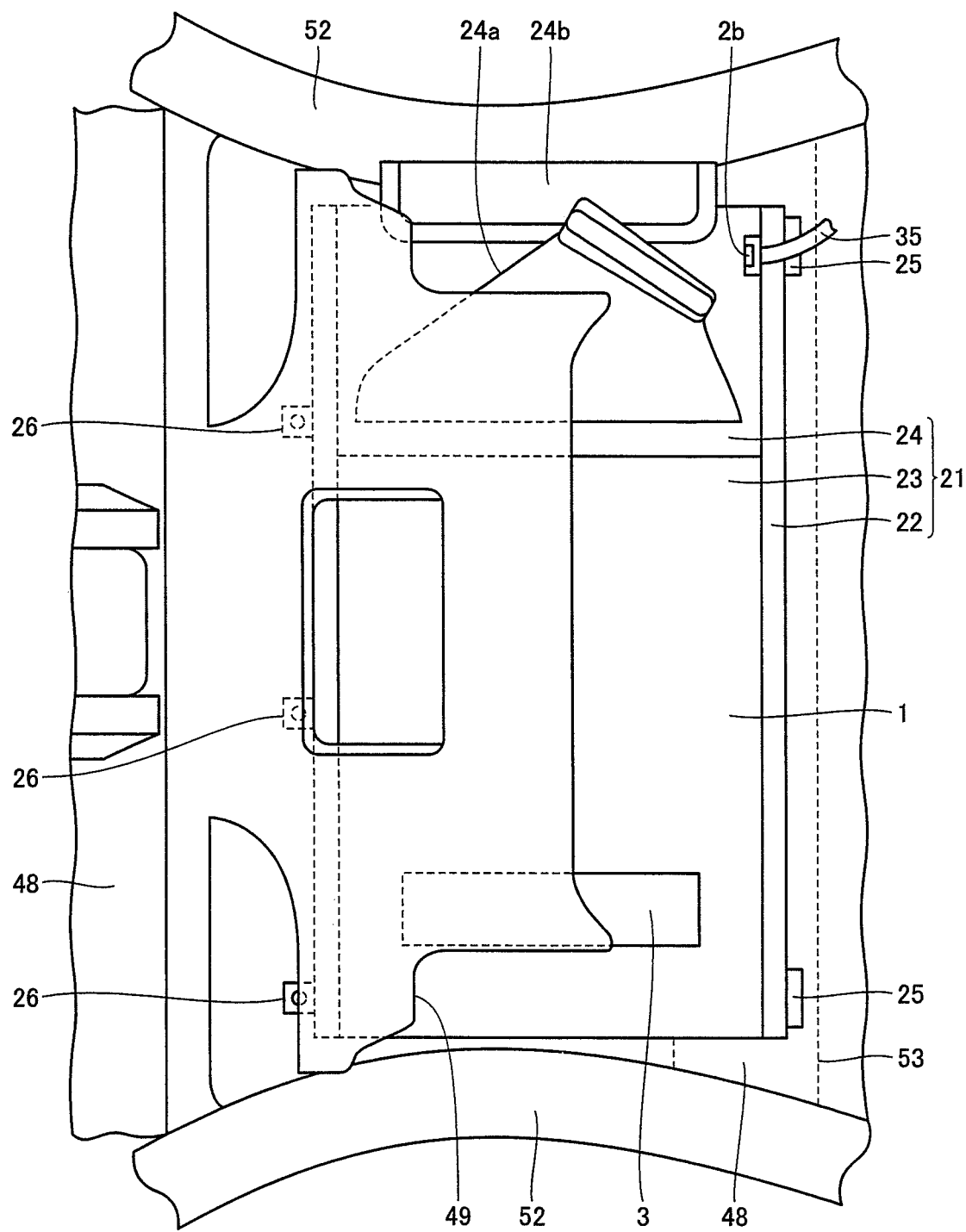
FIG. 5 is a second schematic cross section of the vehicle provided with the power supply device according to the embodiment of the invention.

FIG. 4 is a first schematic cross section showing the battery pack arranged in the vehicle according to the embodiment. FIG. 5 is a second schematic cross section showing the battery pack arranged in the vehicle according to the embodiment. FIG. 4 is the schematic cross section taken along a vertical plane. FIG. 5 is the schematic cross section taken along a horizontal plane.

Referring to FIGS. 4 and 5, the vehicle according to the embodiment includes side members 52, which are arranged on the widthwise opposite ends of the vehicle, respectively. Each side member 52 extends in the longitudinal direction of the vehicle. The vehicle of the embodiment has a cross member 53. Cross member 53 extends in the width direction of the vehicle. Cross member 53 is fixed to side members 52 to couple them together.

The vehicle according to the embodiment includes a floor panel 48, which has a plate-like form. Floor panel 48 in the embodiment is fixed to the lower surfaces of side members 52. Floor panel 48 has a portion carried by cross member 53. Floor panel 48 carries rear seat 44.

A partition panel 49 is arranged behind rear seat 44. Partition panel 49 is arranged to partition a space into a cabin for persons and a trunk room for baggage. Partition panel 49 has a lower end fixed to floor panel 48 and an upper end fixed to an upper back 50. Opposite ends in the vehicle width direction of partition panel 49 are fixed to strainers (not shown), respectively.

Power storage pack 1 in the embodiment is arranged behind partition panel 49. Power storage pack 1 is arranged in the trunk room. Power storage pack 1 is fixed to floor panel 48. Power storage pack 1 is arranged in a region between side members 52 that are arranged on the opposite sides spaced in the vehicle width direction from each other, respectively.

An end of power storage pack 1 opposed to the cabin is fixed to floor panel 48 via a bracket 28. An end of power storage pack 1 remote from the cabin is fixed to floor panel 48 via a bracket 27. In power storage pack 1, plates 25 are fixed to bracket 27. In power storage pack 1, plates 26 are fixed to bracket 28.

The power supply device in the embodiment includes first and second converters. The power storage unit and the first and second converters are fixed to the power storage casing. This structure can provide the power supply device that can supply at least three kinds of voltages. The power supply device in the embodiment can supply the electricity of DC voltages of 288 V, 42 V and 12 V. Further, the respective converters and the power storage unit are integrated to form the pack so that the power supply device can be small in size.

DC/DC converter 2 according to the embodiment is arranged at the longitudinal end of power storage pack 1 remote from the side on which battery module 31 is arranged.

DC/DC converter 2 is arranged at one end of power storage pack 1. When power storage pack 1 is mounted on the vehicle body, DC/DC converter 2 is located near the right end of the vehicle body.

DC/DC converter 3 in the embodiment is arranged at the longitudinal end of power storage pack 1 on the same side as battery module 31. DC/DC converter 3 is arranged at the end remote from the foregoing one end. When power storage pack 1 is mounted on the vehicle body, DC/DC converter 3 is located near the left end of the vehicle body.

In the embodiment, as described above, DC/DC converters 2 and 3 are arranged on the widthwise opposite ends of the vehicle body, respectively. This structure can space the DC/DC converters from each other. Also, this structure can space the parts outputting the different voltages, respectively, from each other. Consequently, it is possible to suppress short circuit between the power supply systems of different voltages as well as generation of noises. For example, if the DC/DC converter were located at the end, on the forward side of the vehicle body, of the power storage pack, the DC/DC converter might be caught between the power storage pack body and the rear seat when a collision from the rear side occurred. By arranging the DC/DC converter on the widthwise opposite ends of the vehicle body, it is possible to avoid the catching of the DC/DC converter between the power storage pack body and the rear seat even when the collision from the rear side occurs.

In the embodiment, DC/DC converters 2 and 3 are configured not to protrude from the front and rear end surfaces of the vehicle body, respectively. In a plan view of power storage pack 1, DC/DC converters 2 and 3 are arranged within a region of power storage casing 21. This structure can suppress damages of the DC/DC converter when the power supply device receives an impact in any one of the directions.

For example, when the power supply device receives an impact in a sideway direction of the vehicle body, the impact is directly applied to power storage casing 21 so that it is possible to suppress the direct application of the impact to DC/DC converters 2 and 3. Consequently, the damages of DC/DC converters 2 and 3 can be suppressed.

The power storage pack of the embodiment is arranged in the region between the side members that are arranged on the sides spaced from each other in the width direction of the vehicle body, respectively. The side members are parts forming a framework of the vehicle body, and have a high strength. Therefore, even when the impact is applied sideways, the side members can protect the power storage pack.

Figure 6:
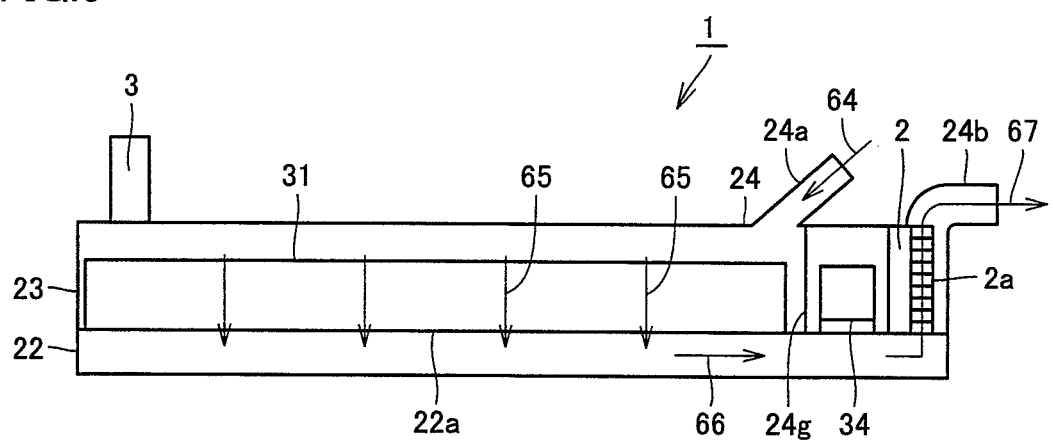
FIG. 6 is a schematic cross section of the power supply device according to the embodiment of the invention.

FIG. 6 is a schematic cross section of the power supply device according to the embodiment. FIG. 6 is the schematic cross section taken along line VI-VI in FIG. 1. Partition 24g of upper casing 24 partitions the interior into a region where electric unit 34 is arranged and a region where battery module 31 is arranged.

Battery module 31 is placed on base plate 22a. An air blower (not shown) supplies a cooling air as indicated by an arrow 64 into the power supply device according to the embodiment. The air blower is configured, e.g., to supply the air taken from the trunk room.

The cooling air is supplied through intake duct 24a. The cooling air flows through spaces between the battery cells of battery module 31 as indicated by arrows 65, and thereby cools each battery cell.

The cooling air passes through a space between the bottom plate of lower casing 22 and base plate 22a as indicated by an arrow 66. The cooling air is discharged from exhaust duct 24b as indicated by an arrow 67. Exhaust duct 24b is connected to a duct (not shown) through which the cooling air is discharged from the vehicle.

When the cooling air is discharged from power storage pack 1, the cooling air passes through a region where fins 2a of DC/DC converter 2 are arranged. The cooling air cools fins 2a, and thereby cools DC/DC converter 2 itself.

This embodiment is configured to cool forcedly DC/DC converter 2, i.e., the first converter by the cooling device. In the embodiment, the air passage is artificially formed, and at least a part of DC/DC converter 2 is located in this air passage so that DC/DC converter 2 is cooled. Conversely, DC/DC converter 3 is arranged above upper casing 23, and is cooled by self-cooling without performing forced cooling.

The vehicle carries many units that use, as power supplies, the electricity of 12 V supplied from DC/DC converter 2 of the embodiment. DC/DC converter 2 is used frequently, and therefore generates a large amount of heat. However, DC/DC converter 2 is forcedly cooled so that it can perform stable driving.

Conversely, only a small number of units uses, as power supplies, the electricity of 42 V supplied from DC/DC converter 3 in the embodiment. DC/DC converter 3 is used less frequently than DC/DC converter 2, and generates a smaller amount of heat. Therefore, DC/DC converter 3 can be sufficiently cooled by the self-cooling and thereby can perform stable driving.

By cooling the DC/DC converter generating a small amount of heat by the self-cooling, the electric power required for the forced cooling can be small, and also the structure of the power supply device can be simple.

In the embodiment, DC/DC converter 2 is arranged inside power storage casing 21, and DC/DC converter 3 is arranged outside power storage casing 21. This is not restrictive, and each DC/DC converter may be arranged on either side of the power storage casing.

In the embodiment, the converters are arranged at the longitudinally opposite ends of the power storage casing. However, another form may be employed, and each converter can be arranged in arbitrary position. In the embodiment, two DC/DC converters are employed for one power supply device. However, another form may be employed, and three of more DC/DC converters may be arranged. The foregoing structures of the power supply device in the embodiment may be appropriately combined or only a part of these structures may be used to form a new power supply device.

In the foregoing drawings, the same or corresponding portions bear the same reference numbers.

Although the present invention has been described and illustrated in detail, it is clearly understood that the same is by way of illustration and example only and is not to be taken by way of limitation, the scope of the present invention being interpreted by the terms of the appended claims.

Industrial Applicability

The invention is primarily applied to a vehicle provided with a power storage unit such as a secondary battery or a capacitor.

The invention claimed is:

1. A power supply device to be mounted on a vehicle, comprising:
   a power storage unit;
   a power storage casing for accommodating said power storage unit;
   a first converter stepping down an output voltage of said power storage unit to a first voltage; and
   a second converter stepping down the output voltage of said power storage unit to a second voltage, said power storage unit and said first and second converters being fixed to said power storage casing, and said first converter and said power storage unit being forcedly cooled by a common cooling device, and said second converter being cooled by self-cooling, wherein said second converter is mounted on an external surface of said power storage casing, and wherein said first converter and said second converter are arranged respectively at opposite ends of said power storage casing with at least a portion of said power storage unit interposed therebetween.

2. A vehicle comprising the power supply device according to claim 1, wherein said first and second converters are arranged at widthwise opposite ends of a vehicle body, respectively, and said first and second converters and are arranged without protruding from front and rear end surfaces, on front and rear sides of the vehicle body, of said power storage casing.

3. A power supply device to be mounted on a vehicle, comprising:

a power storage unit;

a power storage casing for accommodating said power storage unit;

a first converter stepping down an output voltage of said power storage unit to a first voltage; and a second converter stepping down the output voltage of said power storage unit to a second voltage, said power storage unit and said first and second converters being fixed to said power storage casing, and said first converter and said power storage unit being forcedly cooled by a common cooling device, and said second converter being cooled by self-cooling, wherein said second converter is mounted on an external surface of said power storage casing, and wherein said first converter and second converters are arranged at lengthwise opposite ends of said power storage casing, respectively.

4. A power supply device to be mounted on a vehicle, comprising:

a power storage unit;

a power storage casing for accommodating said power storage unit;

a first converter stepping down an output voltage of said power storage unit to a first voltage; and a second converter stepping down the output voltage of said power storage unit to a second voltage, said power storage unit and said first and second converters being fixed to said power storage casing, and said first converter and said power storage unit being forcedly cooled by a common cooling device, and said second converter being cooled by self-cooling, wherein said second converter is mounted on an external surface of said power storage casing, and wherein said first converter and second converters are arranged at widthwise opposite ends of a vehicle body, respectively.

* * * * *